(No Model.)
J. TUTTLE.
PERFORATED COOKING RACK.
No. 303,598. Patented Aug. 12, 1884.
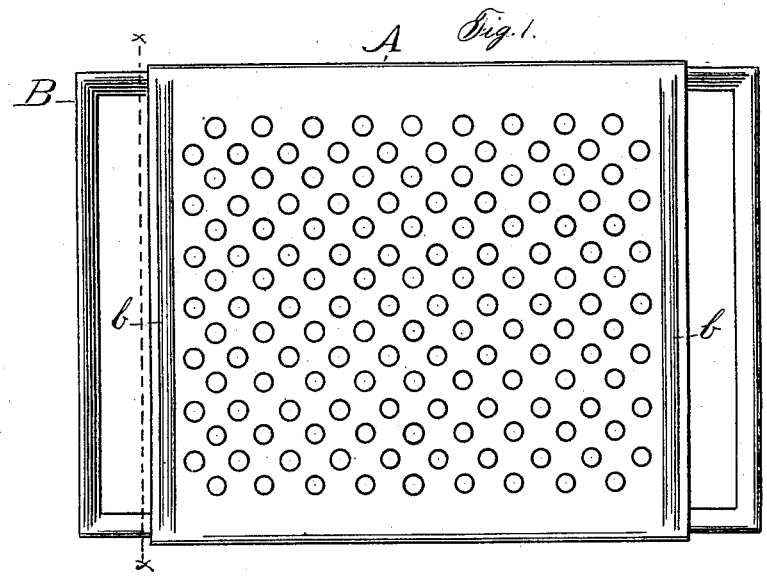
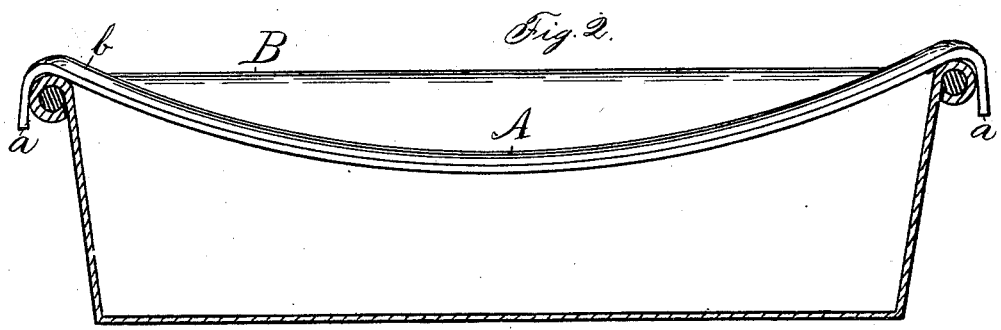
Witnesses:
John Edwards Jr.
Eddy N. Smith
Inventor.
James Tuttle
By James Shepard
Atty.

United States Patent Office.

JAMES TUTTLE, OF MERIDEN, CONNECTICUT, ASSIGNOR OF ONE-HALF TO A. J. BECKLEY, OF NEWARK, NEW JERSEY.

PERFORATED COOKING-RACK.

SPECIFICATION forming part of Letters Patent No. 303,598, dated August 12, 1884.

Application filed January 31, 1884. (No model.)

*To all whom it may concern:*

Be it known that I, JAMES TUTTLE, a citizen of the United States, residing at Meriden, in the county of New Haven and State of Connecticut, have invented certain new and useful Improvements in Perforated Cooking-Racks, of which the following is a specification.

My invention relates to improvements in perforated cooking-racks; and the object of my invention is to produce a cooking-rack for use with the ordinary square dripping-pan which is effective in use and simple and inexpensive in construction. I attain this object by the simple construction illustrated in the accompanying drawings, in which—

Figure 1 is a plan view of my improved cooking-rack, together with a dripping-pan; and Fig. 2 is an enlarged sectional view of said pan on line *x x* of Fig. 1, and a side elevation of my rack.

In the accompanying figures, I have shown my perforated cooking-rack A as placed for use in baking upon an ordinary square dripping-pan, B, by means of its folded edges *a*.

I make my improved rack of perforated sheet metal, preferably of sheet-iron, stamped or otherwise worked into the desired form. I curve the body of the rack in a transverse direction, while in a longitudinal direction it is straight, giving it what may be termed a "trough-like form." I make the rack a little shorter than the pan, while its width is equal or greater, as shown in Fig. 2. I provide my rack with two ridges or beads, *b b*, which extend transversely across near two opposite edges thereof, and serve as stiffeners, and help to keep the meat from slipping upon the rack. The size of the perforations in my improved cooking-rack is immaterial; but I prefer to make them of a size varying from three-sixteenths to a quarter of an inch, because, were the holes much smaller, the juices of meat and the salt, as they ooze out during the cooking, would be inclined to gather and clog the apertures or perforations, and, were the perforations much larger, the meat would have a tendency to protrude through the holes and stick to the rack. The perforations can be formed in any ordinary manner—as, for instance, by a gang of dies and punches. My rack is also provided with flanges *a*, bent downward from the straight edges, as shown in Fig. 2, said flanges being adapted to hook over the edges of the pan B, as shown, whereby the rack can be readily placed and adjusted in position upon said pan. When thus in place, only the straight flanged edges *a* rest upon the pan, while the other edges, at the ends of the rack, come inside of the ends of the pan, and thereby permit of a rectangular trough-like rack being used upon a square pan. It also enables the rack to be used without special fitting on a pan which is longer than the rack. The rack may be readily adjusted to fit pans of varying widths within certain limits by bending it a little to give it a greater or less degree of curvature in its transverse direction. I have used the terms "longitudinal" and "transverse" for convenience of description, but do not intend thereby to strictly confine myself to making any one dimension longer than the other, but have used the term transverse with reference to the direction of the rack which spans the pan, and longitudinal with reference to the direction of the flanges *a a*.

I am aware that a prior patent for an oyster-steamer shows a concave circular rack having a flange around its entire edge, and designed to cover the entire top of a funnel-shaped band; and I hereby disclaim the same.

I claim as my invention—

1. The herein-described cooking-rack, consisting of a rectangular piece of sheet metal, curved in a transverse direction, while it is straight longitudinally, and provided with flanges at its straight edges, substantially as described.

2. The herein-described cooking-rack, consisting of a rectangular piece of perforated sheet metal having the flanges *a a* at its straight edges, and the beads or ribs *b b* near its curved edges, substantially as described.

JAMES TUTTLE.

Witnesses:
EDDY N. SWETT,
L. S. BURR.